INVENTOR
RAYMOND GEORGES SCHAYES
GUILLAUME JEAN FOOY
BY
AGENT

United States Patent Office 2,986,651
Patented May 30, 1961

2,986,651
TRIGGER CIRCUIT-ARRANGEMENT COMPRISING TWO TRANSISTORS
Raymond Georges Schayes and Guillaume Jean Fooy, Brussels, Belgium, assignors, by mesne assignments, to North American Philips Company, Inc., New York, N.Y., a corporation of Delaware
Filed Aug. 9, 1956, Ser. No. 603,117
8 Claims. (Cl. 307—88.5)

The present invention relates to trigger circuit arrangements. More particularly, the invention relates to trigger circuit arrangements provided with regenerative direct-current feedback over two transistors and wherein the collector of the first transistor is conductively connected to an input electrode of the second transistor.

According to the invention, the base circuit of the first transistor is connected to a point of constant potential through a capacitor, so that the first transistor can be cut off by means of pulses which bias its collector in the conducting direction with respect to its base and which charge the capacitor of its base circuit through this transistor by collector-base rectification.

The invention will now be described in detail with reference to the accompanying drawing, in which.

Figure 1:
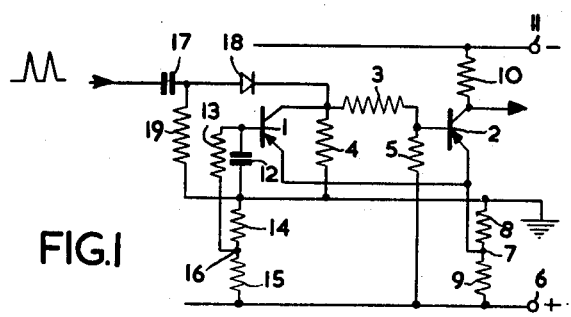
Fig. 1 shows the circuit diagram of one embodiment given by way of example.

The embodiment shown in Fig. 1 contains a first p-n-p-transistor 1, the collector of which is conductively connected to the base of a second p-n-p-transistor 2 through a resistor 3. This collector is also connected to earth through a load resistor 4 and the base of the second transistor is connected, through a large resistor 5, to a terminal 6 of a voltage supply, which terminal is positive with respect to earth. The emitters of the two transistors are connected together to a tapping 7 on a voltage divider. This voltage divider comprises two resistors 8 and 9 which are connected in series between earth and the positive supply voltage terminal 6. The collector of the second transistor 2 is connected through a load resistor 10 to a terminal 11 of a voltage supply, which terminal is negative with respect to earth. The output voltage may, for example, be taken from the collector of the transistor 2.

According to the invention, the base circuit of the transistor 1 contains an R-C circuit comprising a capacitor 12 and a resistor 13 conneced in series wih each other, the series connection being connected across a resistor 14 of two resistors 14 and 15 which are connected in series and together form a voltage divider 14, 15. The capacitor 12 is connected between the base and earth and the resistor 13 is connected between the base and a tapping 16 on the voltage divider 14—15 which in turn is connected between earth and the positive terminal 6.

In order to cause the trigger circuit to change its condition, positive pulses are supplied through a coupling capacitor 17 and a rectifier 18, for example a germanium diode, to the collector of the transistor 1. The cathode of the rectifier 18 is connected to the collector of the transistor 1 and its anode is connected to earth through a resistor 19.

When the transistor 1 is conductive, its collector is positive with respect to earth and the values of the resistors 3, 4, 5, 8 and 9 are so chosen that the base of the transistor 2, in this event, is biased positively with respect to the emitters and to the tapping 7, so that the transistor 2 is non-conductive. However, the values of the resistors 14 and 15 are so chosen that, under these conditions, the tapping 16 is negative with respect to the emitters.

When a positive pulse arrives at the collector of the transistor 1 through the capacitor 17 and the rectifier 18, the capacitor 12 is charged by collector-base rectification through the transistor 1, so that the base of this transistor is biased positively with respect to its emitter and, at the end of this pulse, the transistor 1 is cut off.

When the transistor 1 is cut off, owing to the collapse of its emitter current, the tapping 7 becomes more positive and, since the collector of the transistor 1 becomes less positive at the end of the pulse, the base of the transistor 2 also becomes less positive. Since the resistor 5 is much larger than the resistors 3 and 4, the potential of this base is lower than that of the tapping 7 and the transistor 2 becomes conductive. The values of the resistors 8 and 9 are such that the current $I_2$ through the transistor 2 slightly exceeds the current $I_1$ which passed the transistor 1 before the trigger circuit changed its condition. When the capacitor 12 has been discharged through the resistors 13 and 14, the base of the transistor 1 consequently remains positive with respect to the tapping 7, so that the trigger circuit iss table in this second condition also.

When a further positive pulse is applied to the collector of the transistor 1, it cannot charge the capacitor 12 through the collector base junction of this transistor owing to the higher negative value of the collector voltage, but it can well reach the base of the transistor 2 through the resistor 3. This base is biased positively with respect to the tapping 7 and consequently the transistor 2 is cut off. As a result the tapping 7 becomes negative again with respect to the tapping 16, so that at the end of this pulse the transistor 1 becomes conductive again.

The above-described circuit arrangement can be simplified in various ways. The resistor 8 can be omitted and the emitters can be connected through the resistor 9 to the terminal 6. In addition, the base of the transistor 1 can be directly connected to the tapping 16 and the values of the resistors 14 and 15 can be made suitably larger. Furthermore, the collector of the transistor 2 can be directly connected to the terminal 11, the output voltage being taken between earth and the emitters. This arrangement has a limitation in that, in the second condition ($I_1=0$), the base of the transistor 2 is substantially at the potential of the terminal 11, so that a stronger positive pulse must be applied to the collector of the transistor 1 in order to cut off this transistor 2 again. In order to secure this change of condition with reliability, the amplitude of this pulse must be equal to the voltage between the terminal 11 and earth.

Figure 2:
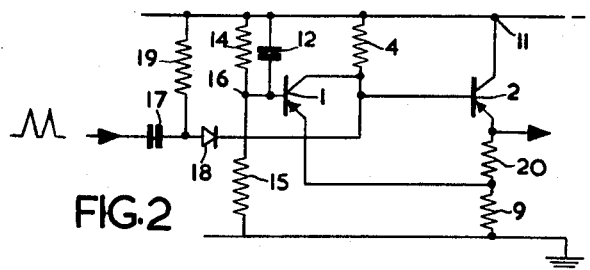
Fig. 2 is a simplified form of the embodiment shown in Fig. 1.

These and other modifications are shown in the embodiment of Fig. 2, wherein a single voltage supply is used. The collector of the transistor 1 is connected to the negative terminal 11 through its load resistor 4 and the base of this transistor is connected to this terminal through the capacitor 12, a voltage divider comprising resistors 14 and 15 being connected between the said negative terminal and earth. The emitters are connected to earth through the resistor 9 and through the resistor 9 and a further resistor 20, respectively.

The resistors 3 and 5 have been omitted and the base of the transistor 2 is directly connected to the collector of the transistor 1, the resistor 20 being connected between the emitter of the transistor 2 and that of the transistor 1. Now the current $I_2$ does not become zero in the first condition, but the base current of the transistor 2 is equal to the small voltage drop between the emitter and collector of the transistor 1 divided by the resistor 20. This base current can consequently be so limited that the current $I_2$ remains small. Since the voltage across the emitter-collector circuit of the transistor 2 exceeds that across the corresponding circuit of the transistor 1, the resistor 9 is directly connected to the emitter of the transistor 1. In this event also, the necessary amplitude of the pulses is equal to the voltage between the terminal 11 and ground. The embodiment of Fig. 2 contains 6 resistors instead of the 10 resistors of the embodiment shown in Fig. 1.

In the first condition ($I_2$ about=0) this trigger circuit is again stable, since the potential of the tapping 16 is negative with respect to earth and the base current of the transistor 2 is limited by the resistor 20. The resistors 9, 14, 15 and 20, however, are so chosen that in the second condition ($I_1$=0) due to comparatively large current $I_2$ the emitter of the transistor 1 becomes negative with respect to its base.

When the current passing through the transistor 2 is limited, by means of resistors 8 and 9 (Fig. 1) or 9 and 20 (Figures 2 and 3), to a value insufficient to cut off the transistor 1 even after the discharge of the capacitor 12, the trigger circuit becomes monostable and the duration of the pulses transmitted is substantially determined by the R-C circuit 12, 13, 14 (Fig. 1) or 12, 14 (Fig. 2).

Figure 3:
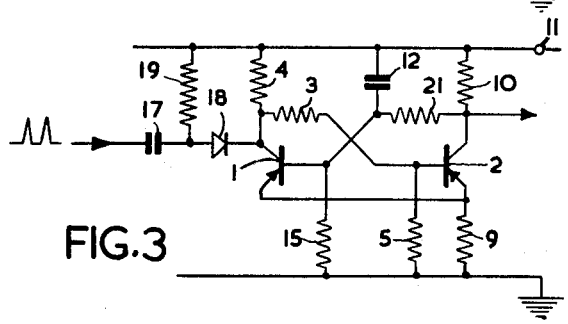
Figures 3 and 4 show the circuit diagrams of further embodiments.

In the embodiment shown in Fig. 3 the two p-n-p transistors are cross-connected. The base of the transistor 1 is connected to earth through the resistor 15 and to the collector of the transistor 2 through a resistor 21. This collector is connected to the negative terminal 11 through the load resistor 10 and the capacitor 12 is connected between the base of the transistor 1 and the terminal 11, to which the resistor 19 is also connected. The emitters of both transistors are connected to earth through the resistor 9 which can be decoupled by means of a capacitor or can be replaced by a voltage supply biasing the said emitters negatively with respect to earth. The output signals are taken from the collector of the transistor 2, they may alternatively be taken from the emitters.

When, for example, the transistor 1 is conductive, the base of the transistor 2 is biased positively with respect to its emitter by the voltage drop across the resistor 4, so that the transistor 2 is cut off and the potential of the base of the transistor 1 is determined by the relationship between the values of the resistor 15 on the one hand and the resistors 21 and 10 on the other hand and has a value such that the transistor 1 remains conductive. The circuit arrangement is symmetrical with respect to the resistors, so that the transistor 2 also becomes conductive and remains conductive when the transistor 1 is cut off. This is achieved by collector-base rectification of a positive pulse which is applied to the collector of the transistor 1 and charges the capacitor 12.

When, in contradistinction thereto, the transistor 2 is conductive, it can be cut off by a positive pulse fed to its base by way of the resistor 3.

When the ratios and values of the resistors 10, 15 and 21 are such that the part set up across the resistor 15 of the voltage drop across the resistor 10 produced by the collector current of the transistor 2 is not sufficient for maintaining the transistor 1 cut off after the discharge of the capacitor 12, this trigger circuit also is monostable. In this event, the duration of the output pulses is substantially determined by the capacitor 12 and the resistors 10 and 21.

Figure 4:
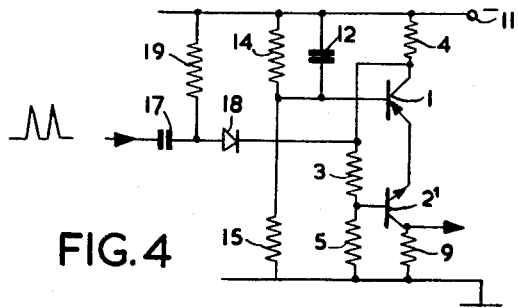

In the embodiment shown in Fig. 4 the two transistors 1 and 2' are connected in series. The transistor 1 is of the p-n-p type and the transistor 2' is of the n-p-n type. The emitters of these transistors are connected together. The control pulses are applied to the collector of the transistor 1 which, through the resistor 3, is directly connected to the base of the transistor 2'. The output signals are taken from the collector of the transistor 2' which is connected to earth through the resistor 9. The bases of the transistors 1 and 2' are biased by means of voltage dividers 14—15 and 3—5 respectively, and the resistor 19 is connected to the negative terminal 11 to which the capacitor 12 shunting the resistor 14 is also connected.

When, for example, the transistor 2' is conductive, the negative potential of the emitters becomes about equal to that of its collector and smaller than the fixed negative rest potential of the base of the transistor 1. As a result, the transistor 1 also becomes conductive. Due to the voltage drop across the load resistor 4 of the transistor 1, the negative potential at the base of the transistor 2' is reduced, so that this transistor becomes more highly conductive. The current passing through the two transistors is finally limited by the potential of the base of the transistor 1 and by the voltage drop across the emitter circuit of this transistor, i.e. the voltage drop across the resistor 9.

When a positive pulse is applied to the collector of the transistor 1, the capacitor 12 is positively charged due to the collector base rectification and the transistor 1 is cut off at the end of the pulse, so that the base of the transistor 2' is driven more negative with the result that this transistor also is cut off. The potential of the emitters thus becomes substantially equal to that of the base of the transistor 2' and more negative than the rest potential of the base of the transistor 1, so that this transistor remains cut off after the discharge of the capacitor 12. A next subsequent positive pulse is not rectified in the collector-base circuit of the transistor 1, which now is nonconductive, but arrives at the base of the transistor 2' which is consequently again rendered conductive. As a result, the negative potential of the emitters becomes again substantially equal to that of the collector of the transistor 2', so that the transistor 1 also becomes conductive.

Should the negative potential of the base of the transistor 2' become too small after the discharge of the capacitor 12 to keep this transistor cut off, then this trigger arrangement would be monostable and produce positive output pulses.

In all the embodiments described, the rectifier 18 and the resistor 19 may, if desired, be omitted. These components act only to produce a better separation between the pulse generator and the trigger circuit and to prevent any undue reaction of the trigger circuit on the pulse generator.

What is claimed is:

1. A trigger circuit arrangement comprising first and second transistors each having an input electrode system comprising a base electrode and an emitter electrode and having an output electrode system comprising a collector electrode and said emitter electrode, means providing a first direct current coupling between the collector electrode of said first transistor and the base electrode of said second transistor, means providing a direct current feedback connection from the input electrode system of said second transistor to the input electrode system of said first transistor, a capacitor connected between the base electrode of said first transistor and a point at constant potential, and means for varying the conducting levels in said transistors comprising means for applying a control pulse to a point in said first direct current coupling means, said control pulse having a polarity and magnitude sufficient to charge said capacitor by collector-base rectification through said first transistor and to bias the base electrode of the said first transistor to such a polarity with respect to the emitter electrode of the said first transistor that the said first transistor is biased to a substantially non-conducting condition.

2. A trigger circuit arrangement comprising first and second transistors each having an input electrode system comprising a base electrode and an emitter electrode and having an output electrode system comprising a collector electrode and said emitter electrode, means providing a first direct current coupling between the collector electrode of said first transistor and the base electrode of said second transistor, means providing a direct current feedback connection from the input electrode system of said second transistor to the input electrode system of said first transistor, a capacitor connected between the base electrode of said first transistor and a point at constant potential, and means for varying the conducting levels in said transistors comprising means for applying a control pulse to a point in said first direct current coupling means whereby the pulse input impedance has a relatively high value, said control pulse having a polarity and magnitude sufficient to charge said capacitor by collector-base rectification through said first transistor and to bias the base electrode of the said first transistor to such a polarity with respect to the emitter electrode of the said first transistor that the said first transistor is biased to a substantially non-conducting condition.

3. A trigger circuit arrangement comprising first and second transistors of similar conductivity type each having an input electrode system comprising a base electrode and an emitter electrode and having an output electrode system comprising a collector electrode and said emitter electrode, means including a resistor providing a first direct current coupling between the collector electrode of said first transistor and the base electrode of said second transistor, means providing a direct current feedback connection from said second transistor to said first transistor, a capacitor connected between the base electrode of said first transistor and a point at ground potential, first and second voltage dividers each connected between said point at ground potential and a terminal of a source of supply voltage, each of said voltage dividers having a tapping point, means connecting the tapping point of said first voltage divider to the base electrode of said first transistor, means connecting the base electrode of said second transistor to said supply voltage terminal, said last-mentioned means comprising a resistor having a relatively large resistance value, means connecting the tapping point of said second voltage divider to said feedback connecting means, means for varying the conducting levels in said transistors comprising means for applying a control pulse to a point in said first connecting means between said first-mentioned resistor and the collector electrode of said first transistor, said control pulse having a polarity and magnitude sufficient to charge said capacitor by collector-base rectification through said first transistor and to bias the base electrode of said first transistor to such a polarity with respect to the emitter electrode of said first transistor that the said first transistor is biased to a substantially non-conducting condition, said pulse magnitude being sufficient to bias said second transistor to a substantially non-conducting condition upon the arrival of a control pulse after the discharge of said capacitor, said resistors and voltage dividers having values such that said second transistor is biased to a substantially conductive condition when said first transistor is in a substantially non-conducting condition and the voltage drop produced by the emitter current of said second transistor at the emitter electrode of said first transistor is of sufficient magnitude and polarity to bias said first transistor to a non-conducting condition after the discharge of said capacitor whereby said circuit arrangement is bistable, and means for deriving an output voltage from the collector electrode of said second transistor.

4. A trigger circuit arrangement comprising first and second transistors of similar conductivity type each having an input electrode system comprising a base electrode and an emitter electrode and having an output electrode system comprising a collector electrode and said emitter electrode, means providing a first direct current coupling between the collector electrode of said first transistor and the base electrode of said second transistor, means including a resistor providing a direct current feedback connection from said second transistor to said first transistor, a capacitor connected between the base electrode of said first transistor and a terminal of a source of supply voltage, a voltage divider connected between said supply voltage terminal and a point at ground potential, said voltage divider having a tapping point, means connecting the tapping point of said voltage divider to the base electrode of said first transistor, means connecting said feedback connecting means to a point at ground potential, said last-mentioned means comprising a resistor connected between a point in said feedback connecting means between said first-mentioned resistor and the emitter electrode of said first transistor and said point at ground potential, means for varying the conducting levels in said transistors comprising means for applying a control pulse to a point in said first connecting means, said control pulse having a polarity and magnitude sufficient to charge said capacitor by collector-base rectification through said first transistor and to bias the base electrode of said first transistor to such a polarity with respect to the emitter electrode of said first transistor that the said first transistor is biased to a substantially non-conducting condition, said pulse magnitude being sufficient to bias said second transistor to a substantially non-conducting condition upon the arrival of a control pulse after the discharge of said capacitor, said resistors and said voltage divider having values such that said second transistor is biased to a substantially conductive condition when said first transistor is in a substantially non-conducting condition and the voltage drop produced by the emitter current of said second transistor at the emitter electrode of said first transistor is of sufficient magnitude and polarity to bias said first transistor to a non-conducting condition after the discharge of said capacitor whereby said circuit arrangement is bistable, and means for deriving an output voltage from the emitter electrode of said second transistor.

5. A trigger circuit arrangement comprising first and second transistors of similar conductivity type each having an input electrode system comprising a base electrode and an emitter electrode and having an output electrode system comprising a collector electrode and said emitter electrode, means including a first resistor providing a first direct current coupling between the collector electrode of said first transistor and the base electrode of said second transistor, means including a second resistor providing a first direct current feedback coupling between an input electrode of said first transistor and the collector electrode of said second transistor, means providing a second direct current feedback connection from said second transistor to said first transistor, a capacitor connected between the base electrode of said first transistor and a terminal of a source of supply voltage, a third resistor connected between a point in said second feedback connecting means and a point at ground potential, a fourth resistor connected between the base electrode of said first transistor and a point at ground potential, a fifth resistor connected between the base electrode of said second transistor and a point at ground potential, means for varying the conducting levels in said transistors comprising means for applying a control pulse to a point in said first connecting means between said first-mentioned resistor and the collector electrode of said first transistor, said control pulse having a polarity and magnitude sufficient to charge said capacitor by collector-base rectification through said first transistor and to bias the base electrode of said first transistor to such a polarity with respect to the emitter electrode of said first transistor that the said first transistor is biased to a substantially non-conducting condition, said pulse magnitude being sufficient to bias said second transistor to a substantially non-conducting condition upon the arrival of a control pulse after the discharge of said capacitor, said resistors having values such that said second transistor is biased to a substantially conductive condition when said first transistor is in a substantially non-conducting condition and the voltage drop produced by the emitter current of said second transistor at the emitter electrode of said first transistor is of sufficient magnitude and polarity to bias said first transistor to a non-conducting condition after the discharge of said capacitor whereby said circuit arrangement is bistable, and means for deriving an output voltage from the collector electrode of said second transistor.

6. A trigger circuit arrangement comprising first and second transistors of opposite conductivity type each having an input electrode system comprising a base electrode and an emitter electrode and having an output electrode system comprising a collector electrode and said emitter electrode, means providing a first direct current coupling between the collector electrode of said first transistor and the base electrode of said second transistor, means providing a direct current feedback connection from the input electrode system of said second transistor to the input electrode system of said first transistor, a capacitor connected between the base electrode of said first transistor and a point at constant potential, and means for varying the conducting levels in said transistors comprising means for applying a control pulse to a point in said first direct current coupling means, said control pulse having a polarity and magnitude sufficient to charge said capacitor by collector-base rectification through said first transistor and to bias the base electrode of said first transistor to such a polarity with respect to the emitter electrode of the said first transistor that the said first transistor is biased to a substantially non-conducting condition.

7. A trigger circuit arrangement comprising first and second transistors of opposite conductivity type each having an input electrode system comprising a base electrode and an emitter electrode and having an output electrode system comprising a collector electrode and said emitter electrode, means including a first resistor providing a first direct current coupling between the collector electrode of said first transistor and the base electrode of said second transistor, means providing a direct current feedback connection from the input electrode system of said second transistor to the input electrodes system of said first transistor, a capacitor connected between the base electrode of said first transistor and a terminal of a source of supply voltage, first and second voltage dividers each having a tapping point, said first voltage divider being connected between said supply voltage terminal and a point at ground potential, said second voltage divider comprising said first resistor and a second resistor connected in series with the said first resistor, said second resistor being connected to a point at ground potential, means connecting the tapping point of said first voltage divider to the base electrode of said first transistor, means connecting the tapping point of said second voltage divider to the base electrode of said second transistor, a third resistor connected between the collector electrode of said first transistor and said supply voltage terminal, a fourth resistor connected between the collector electrode of said second transistor and a point at ground potential, means for varying the conducting levels in said transistors comprising means for applying a control pulse to a point in said first direct current coupling means between said first resistor and the collector electrode of said first transistor, said control pulse having a polarity and magnitude sufficient to charge said capacitor by collector-base rectification through said first transistor and to bias the base electrode of said first transistor to such a polarity with respect to the emitter electrode of said first transistor that the said first transistor is biased to a substantially non-conducting condition, said pulse magnitude being sufficient to bias said second transistor to a substantially conducting condition upon the arrival of a control pulse after the discharge of said capacitor, said resistors and voltage dividers having values such that said first transistor is biased to a substantially conductive condition when said second transistor is in a substantially conductive condition and the said second transistor is biased to a substantially non-conductive condition when the said first transistor is in a substantially non-conductive condition whereby said circuit arrangement is bistable, and means for deriving an output voltage from the collector electrode of said second transistor.

8. A trigger circuit arrangement according to claim 2, wherein said first conducting means comprises a resistor and said means for applying a control pulse is connected to the collector electrode of the first transistor, whereby the pulse input impedance is increased by said resistor when said second transistor is in a substantially conductive condition.

References Cited in the file of this patent
UNITED STATES PATENTS

| | | |
|---|---|---|
| 2,655,609 | Shockley | Oct. 13, 1953 |
| 2,745,009 | Moulon | May 8, 1956 |
| 2,764,643 | Sulzer | Sept. 25, 1956 |
| 2,879,410 | Loeb | Mar. 24, 1959 |

FOREIGN PATENTS

| | | |
|---|---|---|
| 167,294 | Australia | July 1, 1954 |

OTHER REFERENCES

Publication entitled "Transistor Circuits" by Shea, Sept. 15, 1953, section 4, pages 175–179.

"Junction Transistor Circuit Applications" (Sulzer), Electronics, August 1953.